United States Patent
Greer et al.

(10) Patent No.: US 9,627,923 B2
(45) Date of Patent: Apr. 18, 2017

(54) APPARATUS AND METHODS FOR BACKFEED DETECTION IN AND CONTROL OF UNINTERRUPTIBLE POWER SYSTEMS

(71) Applicant: Active Power, Inc., Austin, TX (US)

(72) Inventors: Richard Greer, Austin, TX (US); Stephen Edley, Austin, TX (US); Terry Ault, Austin, TX (US)

(73) Assignee: Active Power, Inc., Santa Clara, CA (US)

( * ) Notice: Subject to any disclaimer, the term of this patent is extended or adjusted under 35 U.S.C. 154(b) by 721 days.

(21) Appl. No.: 13/946,036

(22) Filed: Jul. 19, 2013

(65) Prior Publication Data
US 2014/0021789 A1  Jan. 23, 2014

Related U.S. Application Data

(60) Provisional application No. 61/674,221, filed on Jul. 20, 2012.

(51) Int. Cl.
*H02J 9/06*  (2006.01)

(52) U.S. Cl.
CPC ............... *H02J 9/06* (2013.01); *H02J 9/062* (2013.01); *H02J 2009/068* (2013.01); *Y10T 307/615* (2015.04)

(58) Field of Classification Search
None
See application file for complete search history.

(56) References Cited

U.S. PATENT DOCUMENTS

| | | | | |
|---|---|---|---|---|
| 4,104,539 A | * | 8/1978 | Hase | H02J 3/46 307/64 |
| 4,763,013 A | * | 8/1988 | Gvoth, Jr. | H02J 9/062 307/46 |
| 4,763,014 A | | 8/1988 | Model et al. | |
| 6,465,912 B1 | * | 10/2002 | Nakamura | H02J 3/005 307/70 |
| 7,282,813 B2 | * | 10/2007 | Unger | H02H 3/36 307/66 |
| 2010/0010684 A1 | * | 1/2010 | Lorenz | H02H 7/06 700/293 |
| 2013/0099566 A1 | * | 4/2013 | Pfitzer | H02J 3/14 307/29 |

FOREIGN PATENT DOCUMENTS

JP  2002-112470 A  4/2002

* cited by examiner

*Primary Examiner* — David Shiao
(74) *Attorney, Agent, or Firm* — Hulsey P.C.

(57) ABSTRACT

An apparatus and method for backfeed detection in, and control of, an uninterruptible power system is disclosed. An adaptive controller in an uninterruptible power system enables delivery of power from a second, backup, power source, to loads connected to an output of the system, when a first, primary, input source is detected to be in a fault condition. Subsequent to enabling the second power source, and within a time interval that is less than one AC period following the detection of the input fault, the controller may sense and measure a backfeed of energy from the second source to the first source and may adapt a subsequent fault response based upon the measurement of the backfeed. Adapting the subsequent response may comprise adapting a response to a fault at the output. The subsequent response may comprise disabling or enabling delivery of energy from the second source.

18 Claims, 14 Drawing Sheets

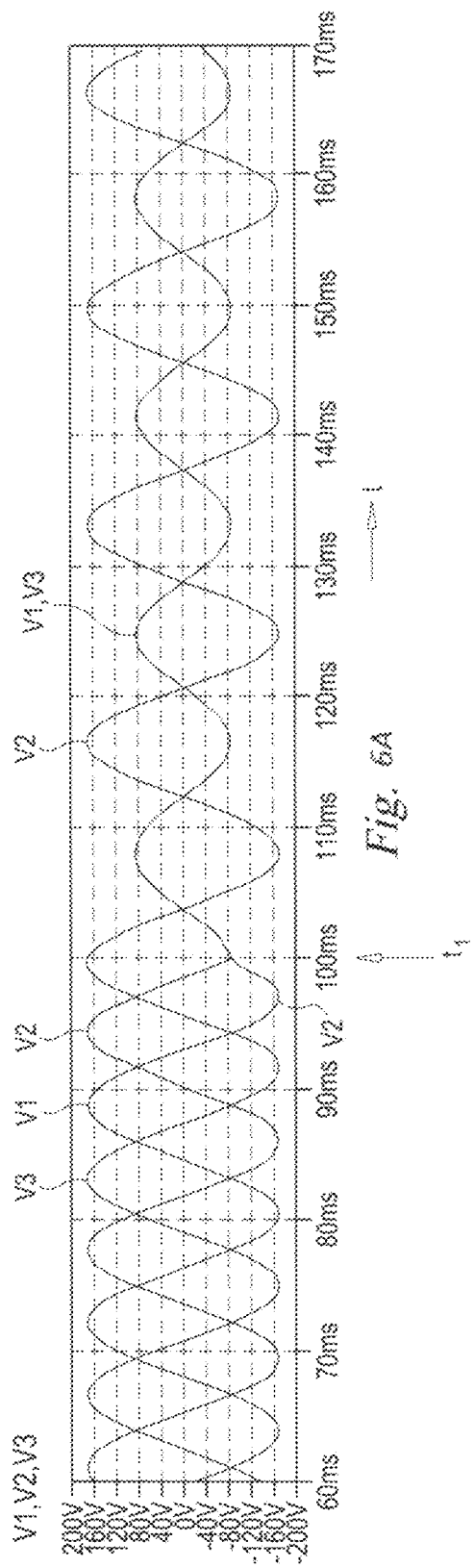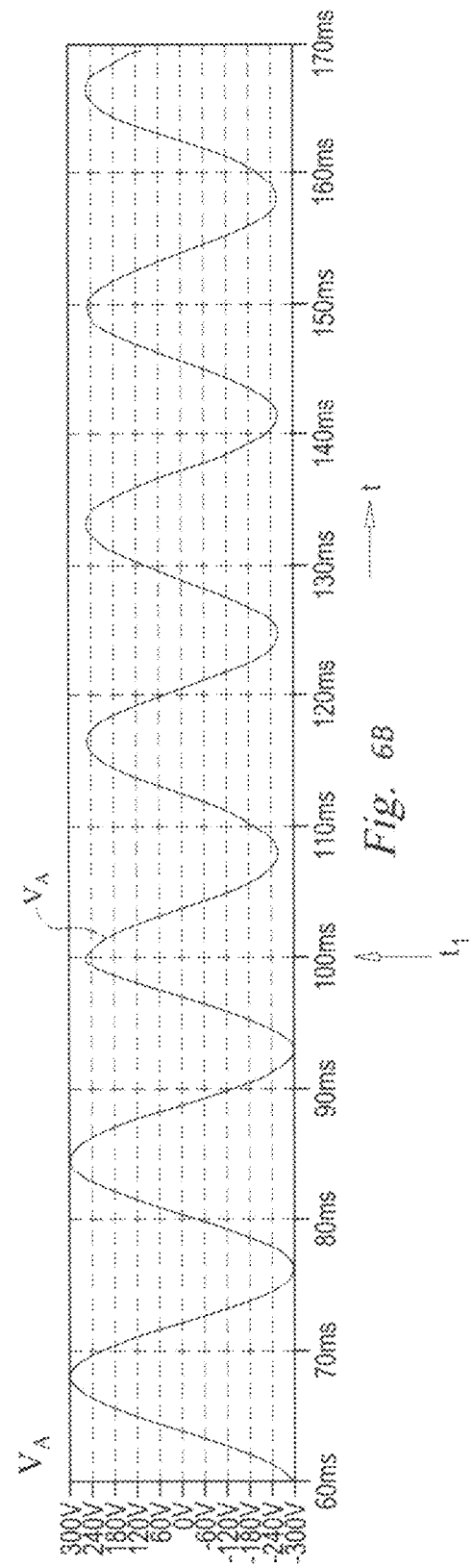
Fig. 6A
Fig. 6B

APPARATUS AND METHODS FOR BACKFEED DETECTION IN AND CONTROL OF UNINTERRUPTIBLE POWER SYSTEMS

CROSS REFERENCE TO RELATED APPLICATION

This application claims the priority of U.S. Provisional No. 61/674,221 filed on Jul. 20, 2012 and entitled "APPARATUS AND METHODS FOR BACKFEED DETECTION IN AND CONTROL OF UNINTERRUPTIBLE POWER SYSTEMS."

FIELD OF THE INVENTION

This invention relates to uninterruptible power systems and supplies. More particularly, this invention relates to control of uninterruptible power systems during fault conditions.

BACKGROUND

A basic function of an uninterruptible power system ("UPS") is to ensure continued delivery of power to loads under a variety of fault conditions. With reference to the block diagram of FIG. 1, for example, a UPS 100 may comprise a first input 102 for receiving energy from a primary power source 103, such as an AC utility source; a second input 104 for receiving energy from a second power source 105, such as a battery or an AC generator; and an output 106 for delivering energy to loads 112. In some embodiments the second power source 105 may be included within the UPS 100. In operation, power for loads 112 may be derived from the primary power source 103 when primary power source quality is acceptable (e.g., when the source is within pre-defined limits of voltage and frequency) or may be derived from the backup power source 105 when the primary power source quality is not acceptable. In many systems, it is important the switch between one source and the other be done in a manner that is essentially transparent to the loads. For example, the power sources may be single or three-phase AC sources or DC sources.

Various UPS configurations are currently known. One configuration, referred to herein as a double-conversion UPS, is illustrated in the block diagram of FIG. 2. The double-conversion UPS 100a may, e.g., receive primary power from a three-phase AC utility source 103 and receive backup power from a bank of storage batteries 105a. A rectifier-charger circuit 114 converts the three-phase AC input into DC and an inverter circuit 116 converts the DC back into a three-phase AC output for delivery to loads 112. A controller 118 may monitor various system parameters and control the rectifier-charger circuit 114 and the inverter circuit 116 as a means of providing uninterrupted power flow to the loads 112; the controller may also control the inverter 116 to regulate the voltage and frequency of the AC output delivered to the loads.

Another UPS configuration, referred to herein as a line-interactive UPS, is shown in FIG. 3. The line interactive UPS 100b may, e.g., receive primary power from a three-phase AC utility source 103 and receive backup power from a backup AC generator 105b. The backup AC generator may, e.g., be a flywheel motor/generator of the kind described in Clifton et al, Energy Storage Flywheel Emergency Power Source and Methods, U.S. Pat. No. 5,932,935, issued Apr. 11, 1997 which is hereby incorporated by reference in its entirety. Each phase of the line-interactive UPS 100b may comprise a static AC switch 122 and a backup power conditioner 130. With reference to FIG. 4, a static AC switch 122 may comprise a pair of back-to-back SCRs 161,162. The backup power conditioner may comprise a flywheel inverter 128, a storage capacitor 126 and a utility converter 124. A controller 120 monitors the various inputs and outputs and controls the static AC switch 122 and the backup power conditioner 130 in order to provide uninterrupted power flow to the loads 112. Operation of a line-interactive converter is described in detail in *Operation and Performance of a Flywheel-Based Uninterruptible Power Supply (UPS) System*, White Paper #108, published by Active Power Inc., Austin, Tex., 78758, USA which is hereby incorporated by reference in its entirety. Under "normal" operating conditions (as used herein, "normal operation" or "normal operating conditions" refer to operation or conditions under which the primary source is within acceptable operating limits of voltage and frequency and power is being delivered from the AC utility source to the loads), the static AC switch 122 is ON and three-phase power is delivered from the AC utility source 103 to the loads via the output three-phase bus 136; the controller 120 may also regulate the output three-phase bus voltage by controlling the flow of reactive power between the power conditioner 130 and the bus 136 via inductor 134.

Other known UPS topologies include, but are not limited to, Delta Conversion UPS, Rotary UPS and Hybrid UPS. Known backup energy sources include, but are not limited to, batteries, flywheel motor-generators, compressed air, fuel cells and fossil fuel powered motor-generator sets.

As shown in FIGS. 2 and 3, a UPS may comprise a bypass circuit 140 and the bypass circuit may, e.g., comprise a static AC switch of the kind shown in FIG. 4. When enabled, the bypass circuit 140 provides a direct connection between the primary power source and the loads.

Conversion efficiency during normal operation is an important UPS performance factor because higher conversion efficiency translates into reduced power loss and lower utility costs. Because the double-conversion UPS configuration processes utility power in each of two cascaded stages, its operating efficiency under normal operating conditions may be lower when compared, e.g., to a line interactive UPS, in which normal power flow is through a static AC switch. To improve normal operating efficiency, a double-conversion UPS may, under normal operating conditions, enable its bypass circuit 140, thereby allowing power to flow directly from the AC utility source 103 to the loads 112 and avoiding some of the losses associated with cascade power processing. This "eco-mode" of operation may improve normal conversion efficiency to a level comparable to the efficiency of a line-interactive converter; in doing so, however, the regulation and isolation advantages provided by the double-conversion topology are lost.

In operation, a UPS responds to a variety of fault conditions. For example, upon detection of an input undervoltage condition, a typical UPS may first respond by disconnecting the primary source and enabling power delivery between the secondary source 105 and the loads 112. Thereafter, the controller may monitor for an output fault (e.g., an output undervoltage condition), because presence of an output fault may indicate an overcurrent condition at the loads 112. If no output fault is detected, and the input fault persists, the loads may remain connected to the second source. If an output undervoltage fault is detected, however, the controller may disconnect the second source and activate a bypass circuit to directly connect the primary source 103 to the loads 112.

SUMMARY

In one aspect, in general, an apparatus for supplying power to a load may include an energy delivery system that may include a first input for receiving energy from a first AC input voltage source, the first AC input voltage source characterized by an AC period; a second input for receiving energy from a second AC input voltage source; and an output for connection to the load. The apparatus may include a controller configured to detect and respond to a fault on the first input by enabling delivery of energy from the second input source, and, within a time interval that ends less than one AC period following the detection: sense and measure a backfeed of energy from the second source toward the first source, and adapt a subsequent response based upon the measurement of the backfeed.

Implementation of the apparatus may include one or more of the following features. Adapting the subsequent response may include adapting a response to a fault at the output. Adapting the subsequent response my include adapting a response to a fault at the second input. Adapting a response to a fault at the second input may include comparing the backfeed measurements to a set of pre-defined criteria and disabling or enabling delivery of energy from the second input source based upon said comparison. The backfeed measurements may include a measurement of the magnitude of the backfeed current and the pre-defined criteria may include a current threshold for the backfeed current. The backfeed measurements may include a measurement of the rate-of-change of a backfeed current and the pre-defined criteria may include a slope threshold for the rate-of-change of current. The backfeed measurements may include a measurement of the aggregate real power, or real current, flowing from the second source toward the input source and the pre-defined criteria may include a polarity for the said real power flow or real current flow. The pre-defined criteria may include a backfeed measurement period during which the comparisons are made, and the backfeed measurement period may fall within the time interval.

Comparing the backfeed measurements to a set of pre-defined criteria may include: comparing a measurement of the magnitude of a backfeed current to a pre-defined current threshold during a pre-defined backfeed measurement period; comparing a measurement of the rate-of-change of a backfeed current to a pre-defined slope threshold during the pre-defined backfeed measurement period; and determining the direction of the aggregate real power flow, or real current flow, between the second source and the input source. Delivery of energy from the second input source may continue to be enabled if: a backfeed current is above the pre-defined current threshold during the pre-defined backfeed measurement period, and a rate-of-change of a backfeed current is greater than the pre-defined slope threshold throughout the duration of the pre-defined backfeed measurement period, and aggregate real power, or aggregate real current, flows from the second source toward the input source at the end of the backfeed measurement period; else, delivery of energy from the second input source may be disabled.

The first AC input voltage source may be a three-phase source. The second AC input source may be a three-phase source. The AC period may be one-sixtieth of a second or it may be one fiftieth of a second. The first AC input voltage source may be a utility power source. The second AC input source may be a backup power source. The backup power source may include an energy storage device and the energy storage device may include: a flywheel, a battery, compressed air, or a fuel cell. The backup power source may include a motor generator set and the energy storage device may include a fuel supply for the motor. The motor may be a diesel engine. The backup power source may include an electric motor-generator including a flywheel energy storage device. The electric motor-generator may generate three-phase AC power.

The apparatus may include a bypass circuit, which, when enabled, provides a connection between the input source and the load and which, when disabled, opens the connection. The controller may deliver a signal to the bypass circuit to enable or disable the circuit. The controller may send a disable signal to the bypass circuit prior to enabling delivery of power from the second AC input source. The bypass circuit connection may be opened at a time following the delivery of the disable signal, the time substantially corresponding to the time of the first zero crossing of the AC current carried by the bypass circuit.

The energy delivery system may include: a line interactive backup system, a double-conversion backup system, a delta conversion backup system, or a rotary UPS backup system.

The controller may be configured to control a flow of energy between and among the first and second AC input sources and the load. The apparatus may include the first AC input voltage source. The apparatus may include the second AC input voltage source.

In another aspect, in general, a method for controlling a UPS includes monitoring a first input voltage source that is connected to a first UPS input and that supplies power, via a controlled AC switch, to loads connected to a UPS output, the first input voltage source characterized by an AC period. The method includes detecting a fault condition in the first input voltage source, and responding to the fault condition by enabling delivery of power from a second input voltage source, connected to a second UPS input, to the loads, and, within a time period that is less than one AC period: detecting and measuring a backfeed of energy from the second input source toward the first input source; and adapting a subsequent fault response based upon the measuring of the backfeed.

Implementation of the method may include one or more of the following features. In some examples, adapting a subsequent fault response may include enabling or disabling delivery of power from the second input source based upon the backfeed measuring. The backfeed measuring may include measuring the rate-of-change of a backfeed current. The backfeed measuring may include measuring the magnitude of a backfeed current. The backfeed measuring may include detecting the polarity of a flow of real power, or a flow of real current, from the second input source toward the first input source. The backfeed measuring may include making a measurement at the first input. The backfeed measuring may include making a measurement at the second input. The method may include comparing the rate-of-change of the current to a pre-determined slope threshold and adapting the response based upon the comparison. The method may include comparing the magnitude of the current to a pre-determined magnitude threshold and adapting the response based upon the comparison. The method may include adapting the response based upon the polarity of the real power flow or the real current flow. The measuring may be done within a determination interval that is less than one AC period. In some examples, the method may include continuing to enable delivery of power from the second source if a backfeed measurement exceeds a respective threshold during the determination interval, else disabling delivery of power from the second input source. In some examples, the method may include configuring the UPS to comprise a bypass circuit, the bypass circuit configured to enable a connection between the first input source and the loads, and enabling the bypass circuit if a backfeed measurement does not exceed a respective threshold.

BRIEF DESCRIPTION OF THE DRAWINGS

FIG. 6A shows a three-phase source waveform illustrating three primary winding voltages.

FIG. 6B shows a three-phase source waveform illustrating a secondary phase voltage.

DETAILED DESCRIPTION

Figure 1:
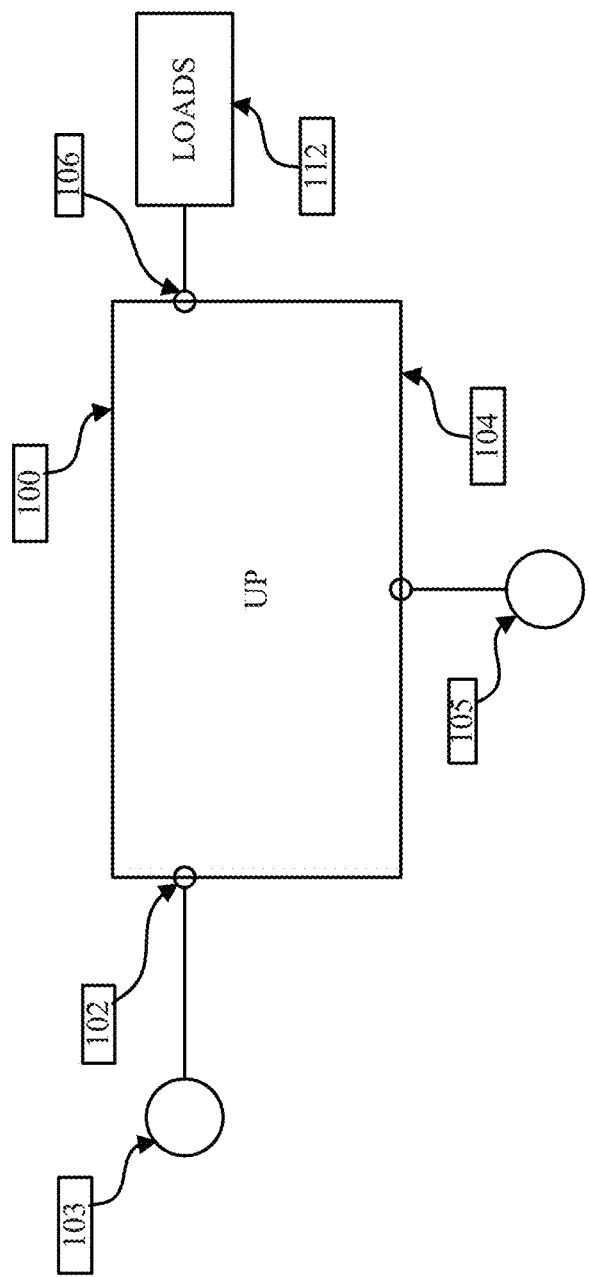
FIG. 1 shows a block diagram of an uninterruptible power system ("UPS").
Figure 2:
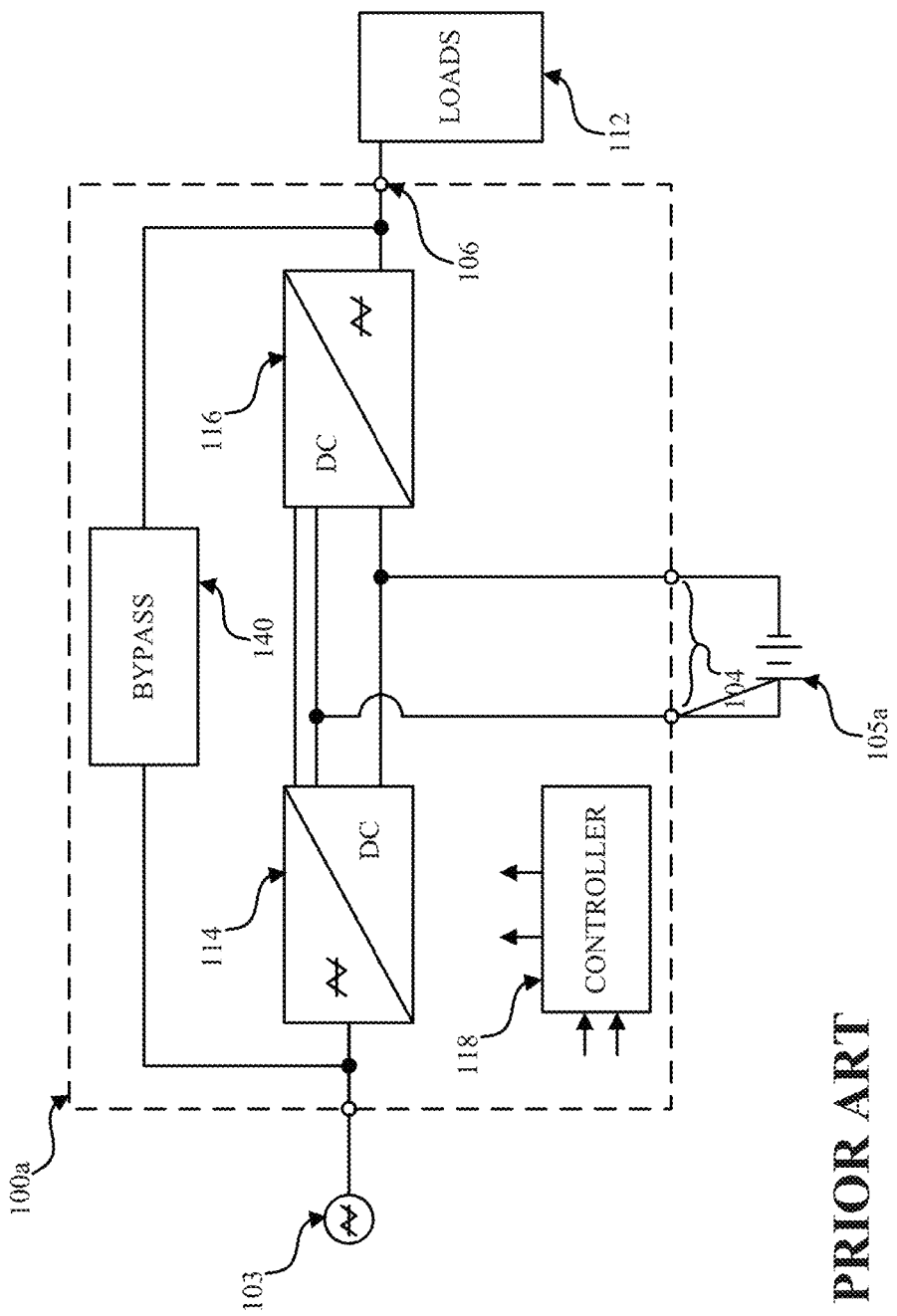
FIG. 2 shows a block diagram of a double-conversion UPS.
Figure 3:
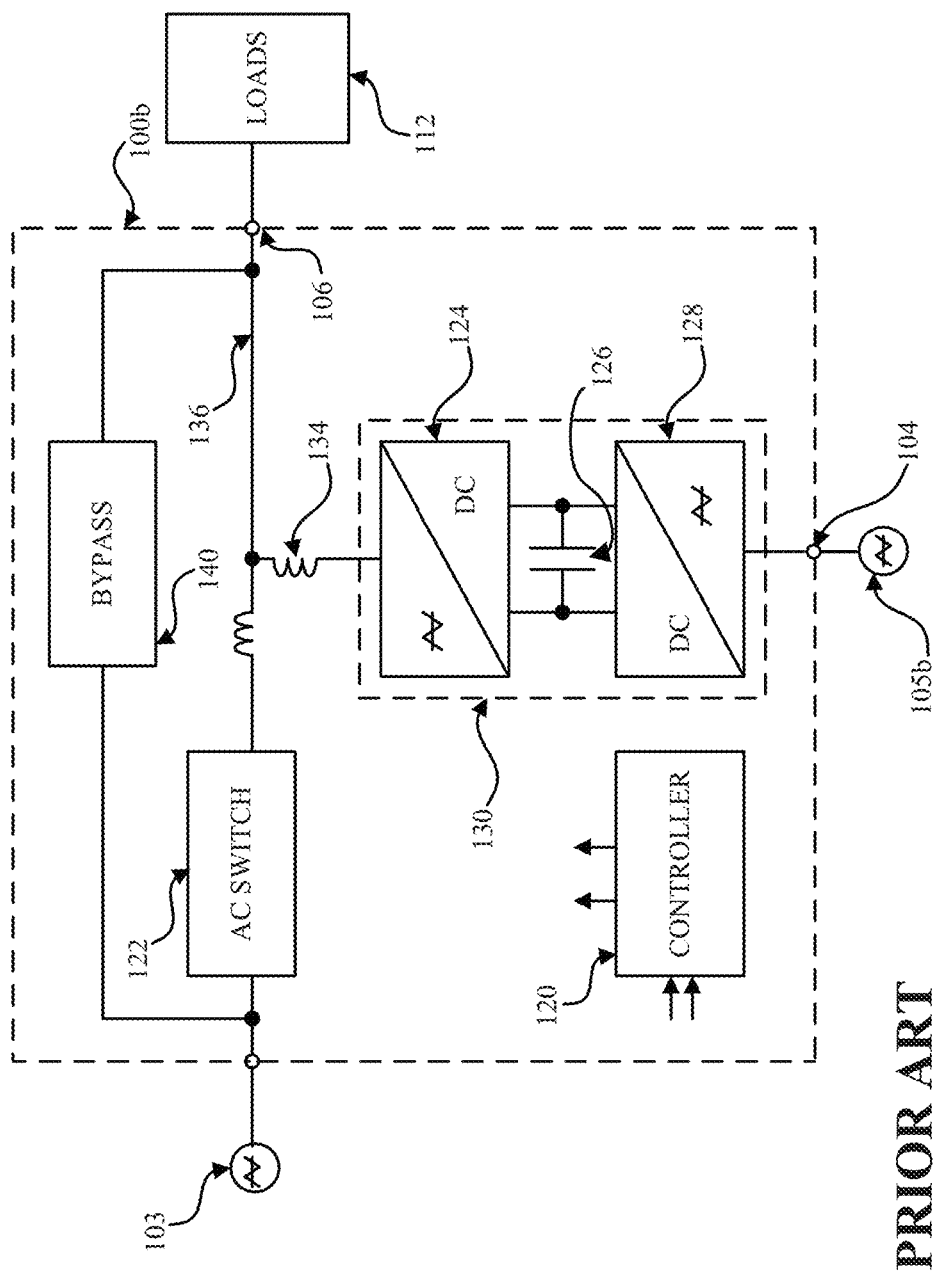
FIG. 3 shows a block diagram of a line-interactive UPS.
Figure 5:
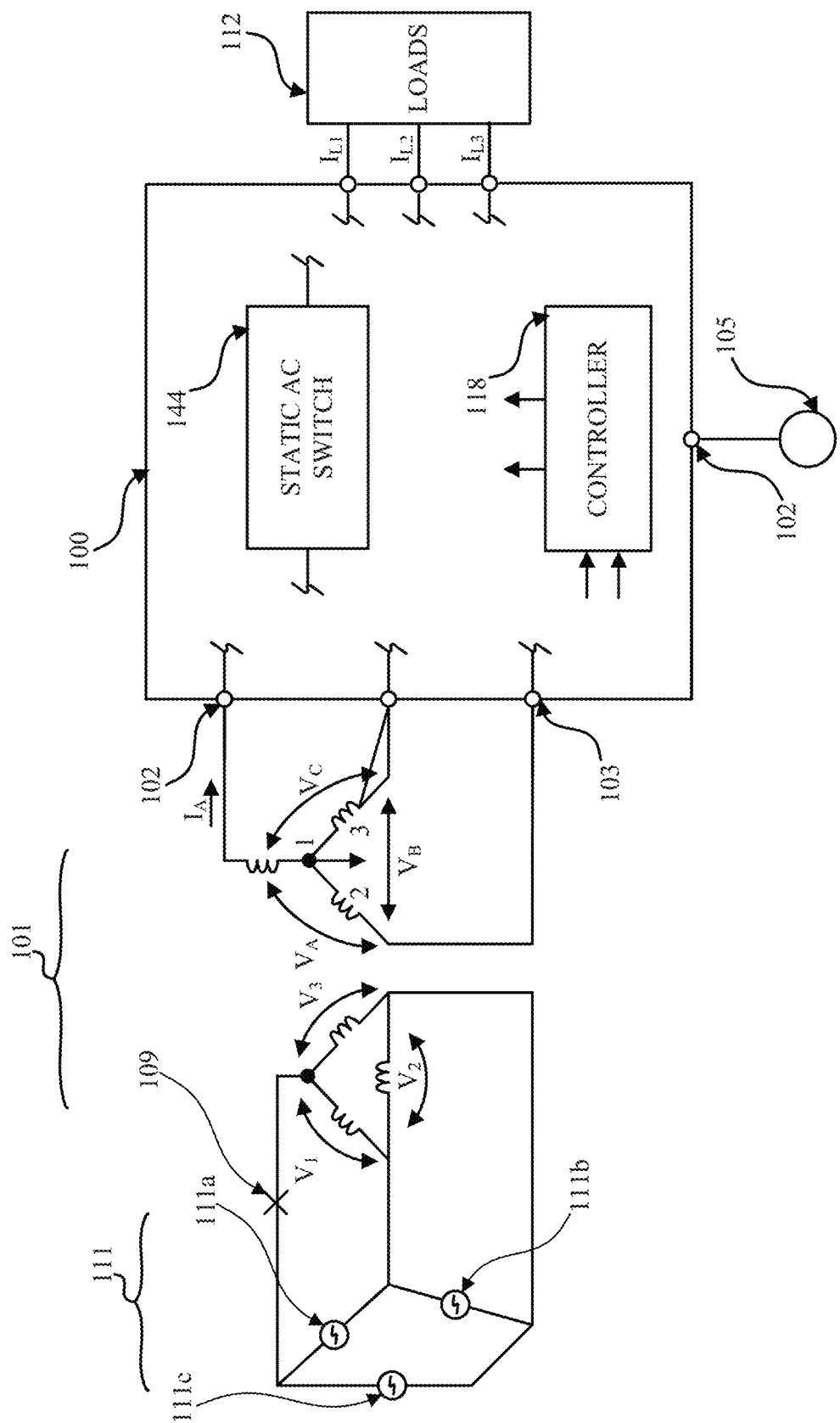
FIG. 5 shows a UPS system comprising a static AC switch.

FIG. 5 shows a UPS 100 comprising a static AC switch 144. Under normal operating conditions the static AC switch may be enabled (e.g., by controller 121) to carry current between a first, primary, input source 103 and loads 112 (for example, input current $I_A$ may be conducted by switch 144 and delivered to loads 112 as current $I_{L1}=I_A$). In one example, the UPS 100 of FIG. 5 may be a double-conversion UPS operating in "eco-mode" and the static AC switch 144 may be part of a bypass circuit 140, as described earlier with reference to FIG. 2; in another example, the static AC switch 144 may be part of a line-interactive UPS, as described earlier with reference to FIG. 3 (i.e. static AC switch 122). The disclosed subject matter is not limited to application in the UPS topologies described above, but may be applied in a wide variety of UPS topologies, including, but not limited to, Delta Conversion UPS, Rotary UPS and Hybrid UPS.

In the system of FIG. 5, a delta-wye transformer 101 receives three-phase AC utility voltages 111 at primary windings 107a and transforms the utility voltages to secondary windings 107b voltage levels $V_A$, $V_B$ and $V_C$, that are suitable for driving loads 112. The UPS first input 102 receives the secondary winding voltages as the UPS primary input source 103. The three-phase primary input source 103 is characterized by a normal operating range of variation of AC frequency and period (as used herein the terms "AC frequency" and "AC period" refer to the referenced normal ranges for each). A controller 121 monitors operating conditions (e.g., input voltages, output voltages, output currents, power levels, AC period) and controls energy delivery among and between the first and second sources and the load. The second power source 105 may, e.g., comprise a battery, a flywheel generator, a fossil fuel (e.g., natural gas, gasoline, diesel) motor-generator set, a fuel cell or a compressed air system. Further, in some embodiments the second power source 105 may be included within the UPS 100.

The controller 121 monitors system operating conditions, determines whether a fault has occurred and takes appropriate actions in response to faults. The controller may, for example, measure the rms voltage of each phase and compare the rms voltages to pre-defined minimum and maximum values; the controller may also make frequent measurements (e.g. at a rate, such as 20 KHz, that is much higher than the AC frequency, such as 50 Hz or 60 Hz) of the instantaneous voltage of each phase and compare the values to corresponding points on a sinewave that is stored in system memory—significant divergences may indicate overvoltage or undervoltage transients, utility voltage distortion or deviation from the normal AC frequency.

Figure 6C:
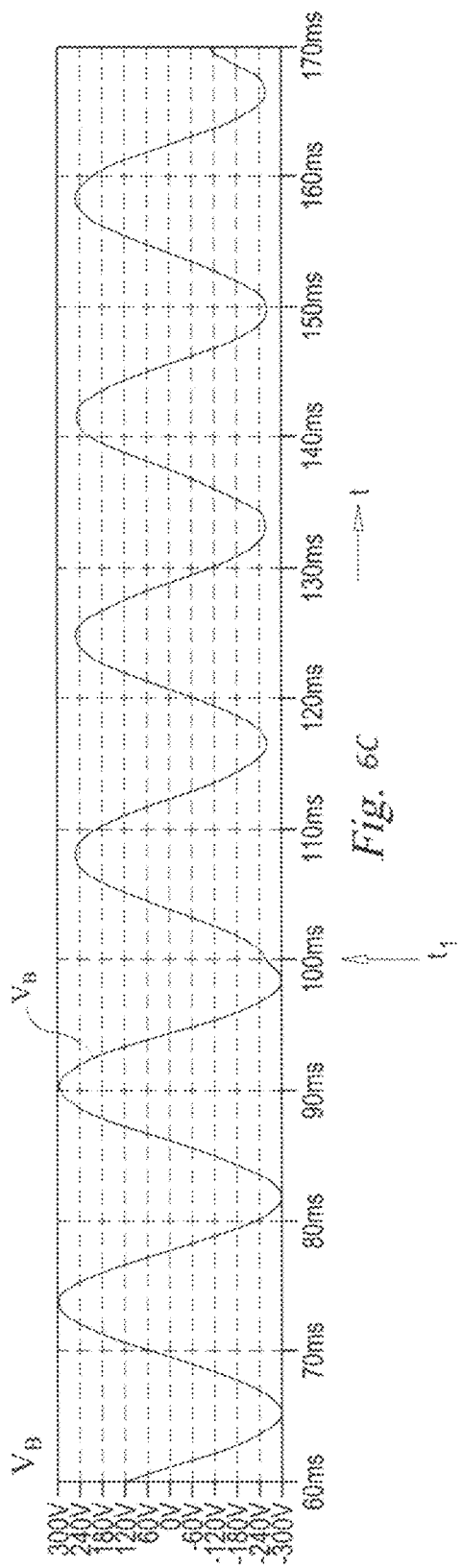
FIG. 6C shows a three-phase source waveform illustrating a secondary phase voltage.
Figure 6D:
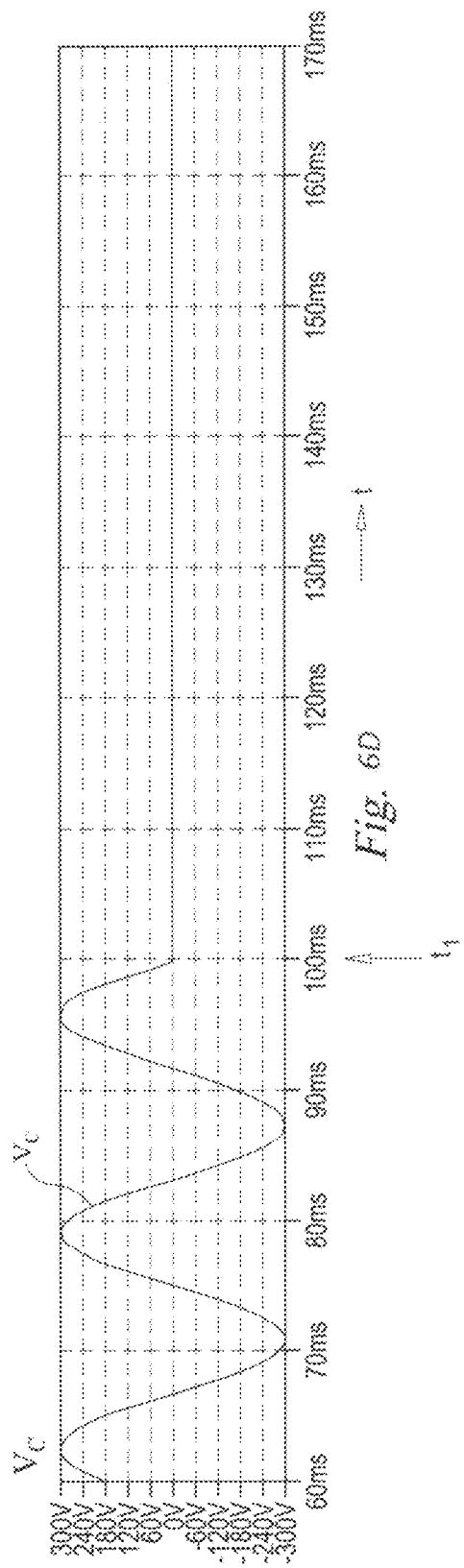
FIG. 6D shows a three-phase source waveform illustrating a secondary phase voltage.

Upon detection of an output undervoltage condition, known UPS systems may activate a bypass circuit (e.g., bypass circuit 140, FIGS. 2 and 3) to directly connect the primary source 103 to the loads 112. In certain circumstances, however, activating a bypass circuit in response to an output undervoltage condition may exacerbate a fault condition rather than alleviate it. FIG. 6, for example, shows an idealized simulation of the effect of a three-phase utility source 111 (FIG. 5) developing an open circuit (e.g., at the location in FIG. 5 marked with X 109) at a time t1. Prior to time t1, the three primary winding voltages V1, V2 and V3 (FIG. 6A), are of equal amplitude and are in their expected relative phase relationship, as are the three secondary phase voltages $V_A$, $V_B$ and $V_C$ (FIGS. 6B, 6C and 6D, respectively). After time t1, however, voltage V2 remains equal to the voltage delivered by source 111b, but the voltages V1 and V3 are each equal to one-half of, and are 180 degrees out of phase with, the voltage V2. The effects on secondary voltages are a collapse of voltage Vc to substantially zero volts, a reduction in the amplitudes of $V_A$ and $V_B$ and a change in their relative phases by +/−60 degrees relative to their phases prior to t1.

Figure 4:
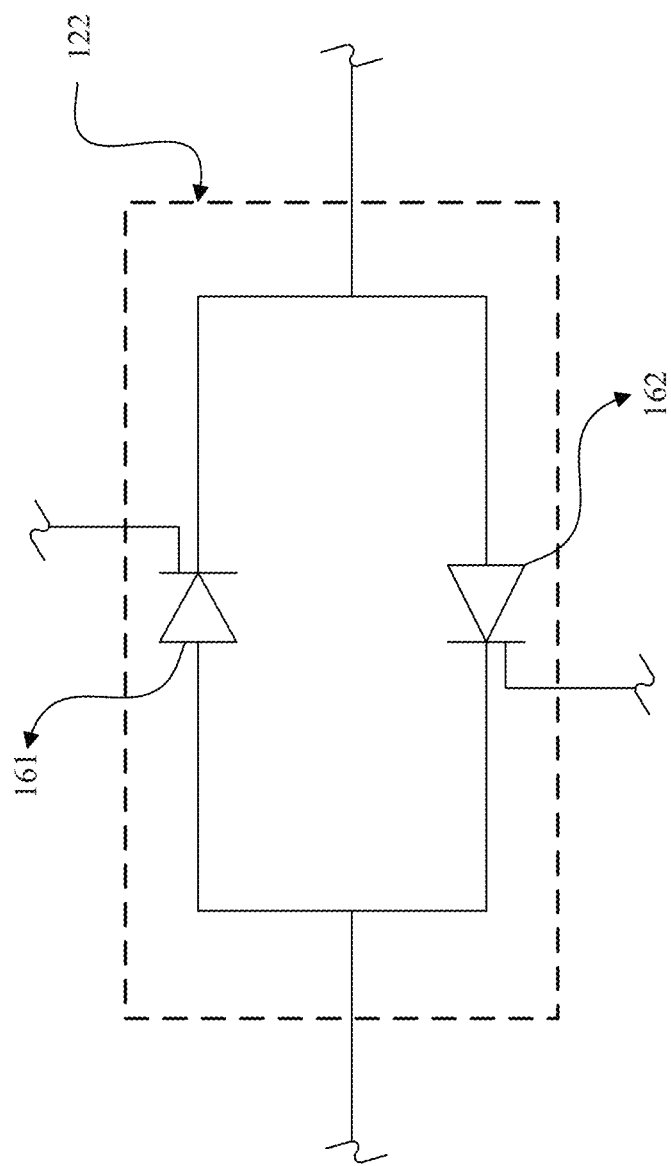
FIG. 4 shows a partial schematic of a static AC switch.

Often, in systems of the kind shown in FIG. 5, in which the static AC switch 144 is carrying current between the input source and the load under normal operating conditions, the controller 121, upon detecting the input source failure at time t1, may initiate a switchover to the second source 105 by disabling the static AC switch and enabling delivery of power from the second source 105. Because the input source 103 voltages are defective, however, activation of the second source 105 may cause a significant backfeed of current and real power from the second source, through the static AC switch 144, toward the input source 103. Disabling of the static AC switch cannot occur until at least the next zero-crossing of current in the switch (for, e.g., a static switch of the kind shown in FIG. 4), and the time of occurrence of the zero-crossing may be delayed owing to the change in the relative phases of the voltages at the UPS input 102. Under these circumstances, the second source 105 may enter current limit, causing the load voltage to decline which the controller may detect as an output fault. Known systems may, in response to the output voltage fault, disconnect the second source and initiate bypass; under the described circumstances, however, initiating bypass will result in the defective primary source being inappropriately connected to the loads.

A UPS in accordance with the disclosed subject matter (an "Adaptive UPS") comprising a controller in accordance with the disclosed subject matter ("adaptive controller") adapts its response to fault conditions based upon system operating conditions. An Adaptive UPS may, for example, after connecting the second source 105, respond to an output fault based upon a determination of whether an output overcurrent (i.e. excessive $I_L$, FIG. 5) and/or a backfeed condition exists. If an output overcurrent condition exists, the adaptive controller may initiate a conventional output fault response (e.g., disconnect the second source and initiate bypass); if, on the other hand, an output overcurrent condition is not present and a backfeed is detected that exceeds pre-defined limits, the adaptive controller may disable a conventional output fault response and leave the second source connected. By this means an Adaptive UPS may ride through a failure of the kind illustrated in FIG. 6 by allowing the second source to remain connected to the loads 112 until the AC switch turns off and the backfeed condition ends.

A feature of an adaptive UPS is that it rapidly detects and adapts its fault response. For example, detection and adaptive response to an input fault may occur within a time interval that is a fraction of an AC period (e.g. in a time interval that is less than one AC period). In some embodiments, detection and adaptive response may occur within a time interval that is less than one-half of one AC period. Rapid response is an important feature in that it enables distinguishing between backfeed and load overcurrent conditions, and adapting an appropriate response in a sufficiently short period of time to avoid inappropriate and unnecessary disconnection of power from loads.

Figure 7:
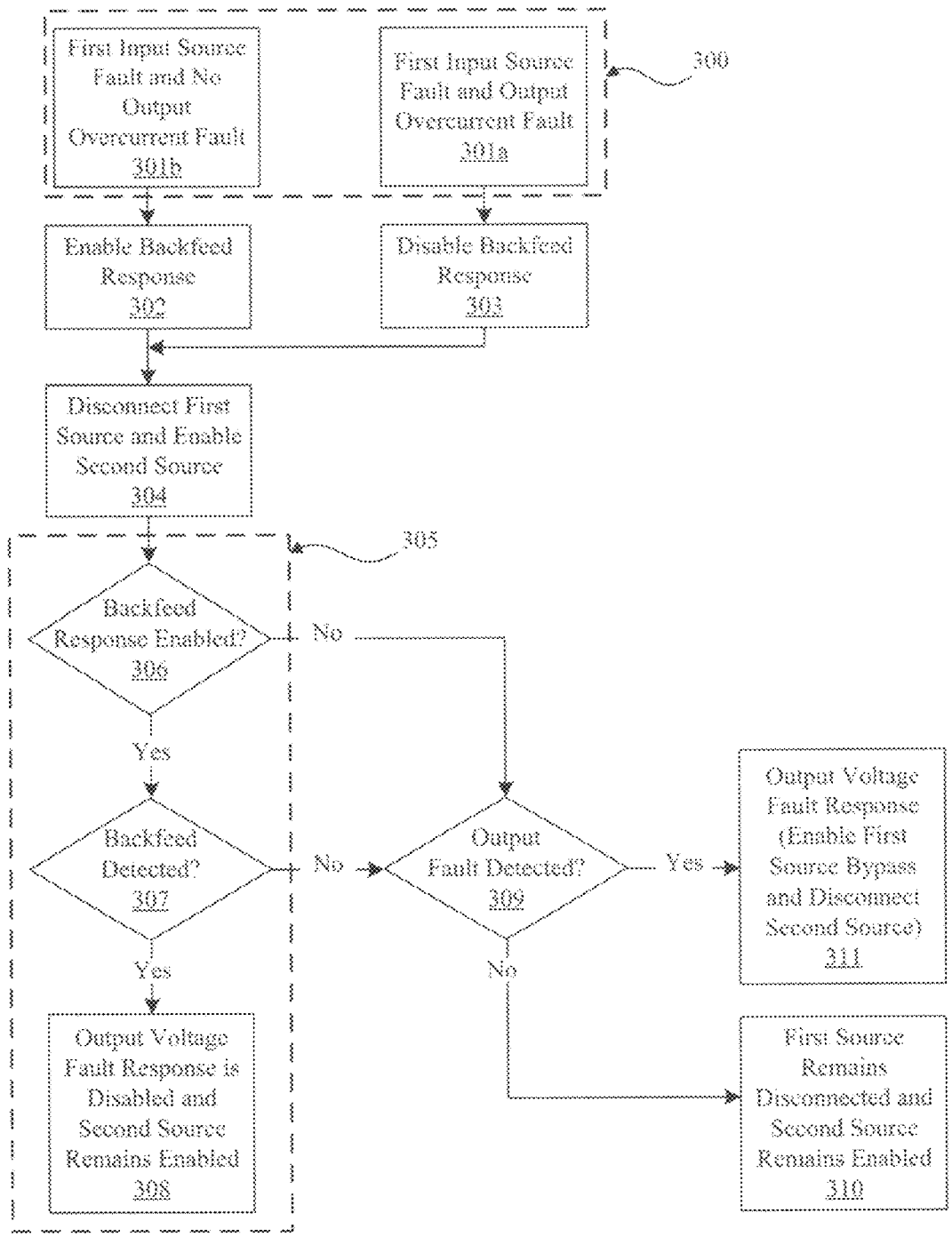
FIG. 7 shows a flow chart of a portion of an algorithm for controlling a UPS according to the invention.

An algorithm for adaptively responding to a UPS input fault is illustrated in the flow chart of FIG. 7. The adaptive controller continuously monitors operating conditions (e.g., first and second source voltages and currents; output voltage and current; backfeed current and power) at a sampling rate (e.g., 20 KHz) that is much greater than the AC frequency.

The algorithm for monitoring and detection, 300 in FIG. 7, comprises monitoring of the AC input source 103 (FIG. 5) and UPS output currents (e.g., currents $I_{L1}$, $I_{L2}$, $I_{L3}$). If, at 301a, an AC input source fault AND an output overcurrent fault are detected, a backfeed flag is set FALSE, at 303, to "disable backfeed response", else, if, at 301b, an AC input source fault is sensed AND an output overcurrent fault is not sensed, the backfeed flag is set TRUE, at 302, to "enable backfeed response." In either case, at 304, the adaptive controller 121 disables the static AC switch 144 and enables delivery of power from the second source 105.

An adaptive response algorithm 305 includes, at 306, a test to determine whether the backfeed flag is TRUE. If the flag is TRUE, indicating that an output overcurrent fault has not been detected, a determination is made, at 307, as to whether a backfeed has been detected (as discussed in more detail below). If a backfeed has not been detected (at 307), or if the backfeed flag is FALSE and the backfeed response is not enabled (at 306), a determination is made, at 309, as to whether the output voltage is in a fault condition: if no output fault is detected the first source remains disconnected and the second source remains connected (at 310); if an output fault is detected, a conventional output fault response is initiated, at 311, by enabling bypass and disconnecting the second source. If, at 306, however, the backfeed flag is TRUE and, at 307, a backfeed is detected, the conventional output fault response is disabled and the second source remains connected (at 308). Detection of an output fault when the second source is connected may, in some system configurations, be done by measuring the load voltage directly or by measuring a voltage at, or derived from, the second input.

Whereas a conventional UPS may, in response to an input fault of the kind shown in the graphs of FIG. 6A-D, cause inappropriate disconnection of the second source from the load, an adaptive UPS, embodying the adaptive algorithm of FIG. 7 may, by making a determination of the cause of the output fault (e.g., an output overcurrent vs. a backfeed condition), adapt a response to enable the second source to remain connected to the loads.

Determination that a backfeed is of a magnitude to disable the conventional output fault response (307, FIG. 7) may comprise, during a determination time interval that is less than an AC period:

1. Monitoring phase currents during the determination time interval and determining whether the current is diverging away from zero at a rate-of-change that exceeds a pre-determined slope threshold during the interval;

2. Monitoring phase currents during the determination time interval and determining whether the magnitude of a phase current exceeds a pre-determined magnitude threshold;

3. Determining, during determination time interval, whether aggregate real power, or real current, from all of the phases is flowing from the second source toward the input source.

In one embodiment, determining that a backfeed is of a magnitude sufficient to disable the conventional output fault response requires that all three of the preceding tests be satisfied.

Figure 8:
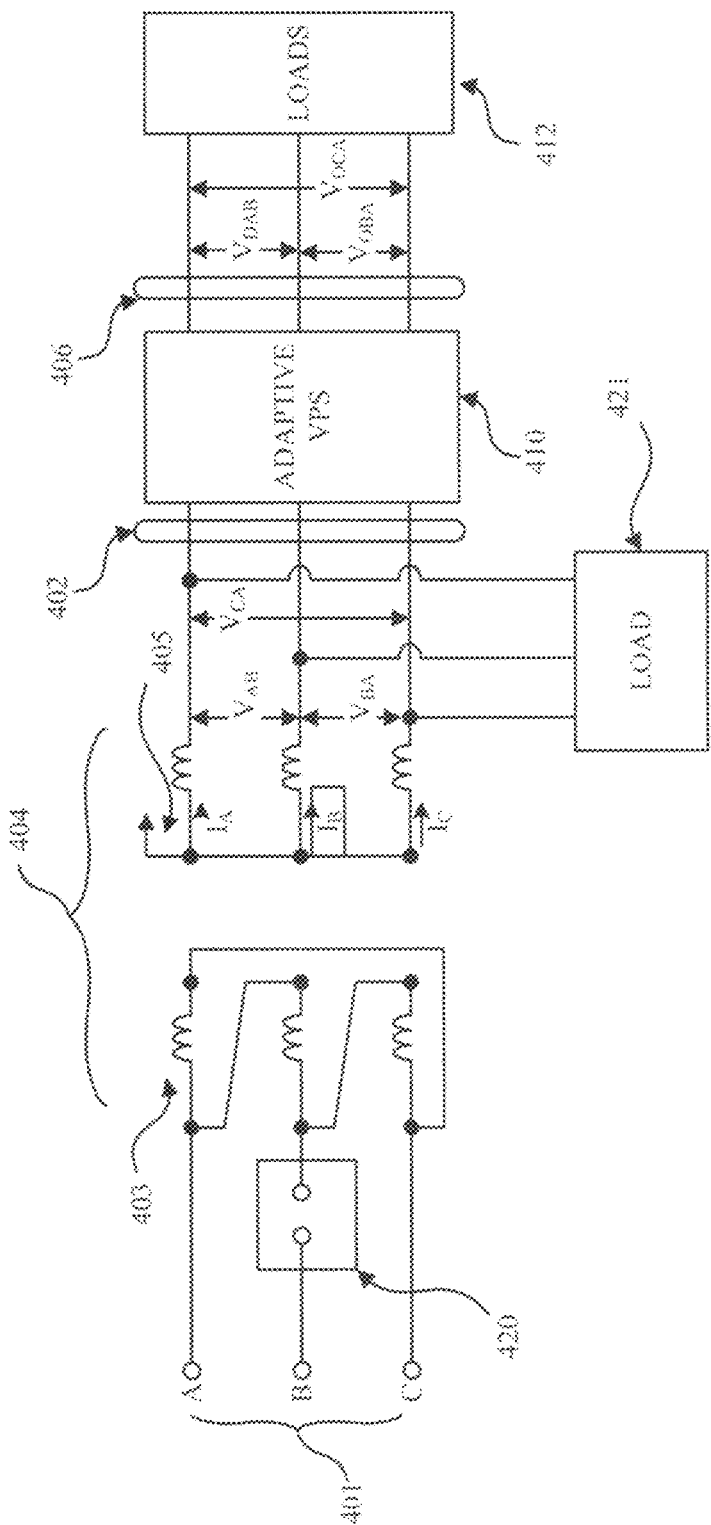
FIG. 8 shows a block diagram of a system comprising an Adaptive UPS according to the invention.

FIG. 8 shows a block diagram of system 400 comprising an Adaptive UPS 410. The system 400 receives primary power from a three-phase first AC source 401, characterized by an AC frequency of 60 Hz and phase voltages of 480VAC rms. The first AC source delivers power to a delta-connected primary winding 403 of a delta-wye transformer 404. A wye-connected transformer secondary winding 405, delivers phase voltages of 480VAC rms to the input 402 of the Adaptive UPS 410. A circuit breaker 420 is connected between phase "B" of the AC source and the primary winding 403. The Adaptive UPS is a three-phase line-interactive UPS rated to deliver 240 Kilowatts at phase voltages of 480VAC rms. A second AC source, included within the Adaptive UPS 410 and not shown in FIG. 8, comprises a flywheel motor-generator. The output 406 of Adaptive UPS 410 is connected to a 200 Kilowatt three-phase load 412. A 1400 Kilowatt three-phase preload 421 is connected across the secondary of transformer 404 to simulate additional devices that may be connected to the secondary of transformer 404.

Adaptive UPS 410 comprises an adaptive controller (not shown) comprising an algorithm such as that shown in FIG. 7. A portion of the algorithm for determining whether a backfeed is detected (307, FIG. 7) comprises detecting, within a determination interval that is less than an AC period: (1) whether the current is diverging away from zero at a rate-of-change that exceeds a pre-determined slope threshold, $S_f$=93 Amperes-per-millisecond, AND (2) whether a phase current exceeds a pre-determined magnitude threshold, Imag=480 Amperes, AND (3) whether an aggregate real current is flowing toward the UPS input 402 and exceeds a real current threshold, $I_{TH}$=300 Amperes.

Figure 9:
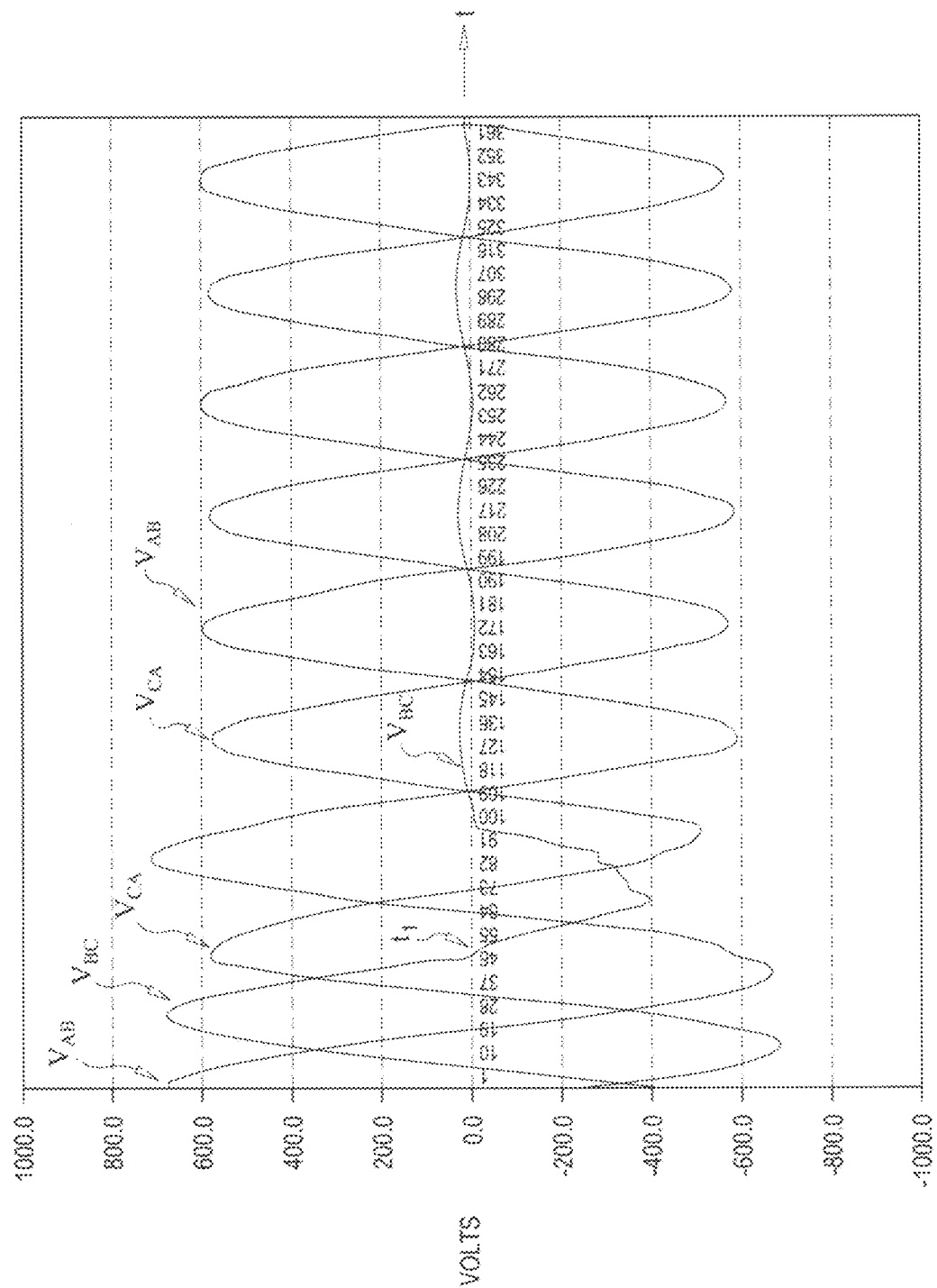
FIG. 9 shows an operating waveform of phase voltages for the system of FIG. 8 under a fault condition.
Figure 10:
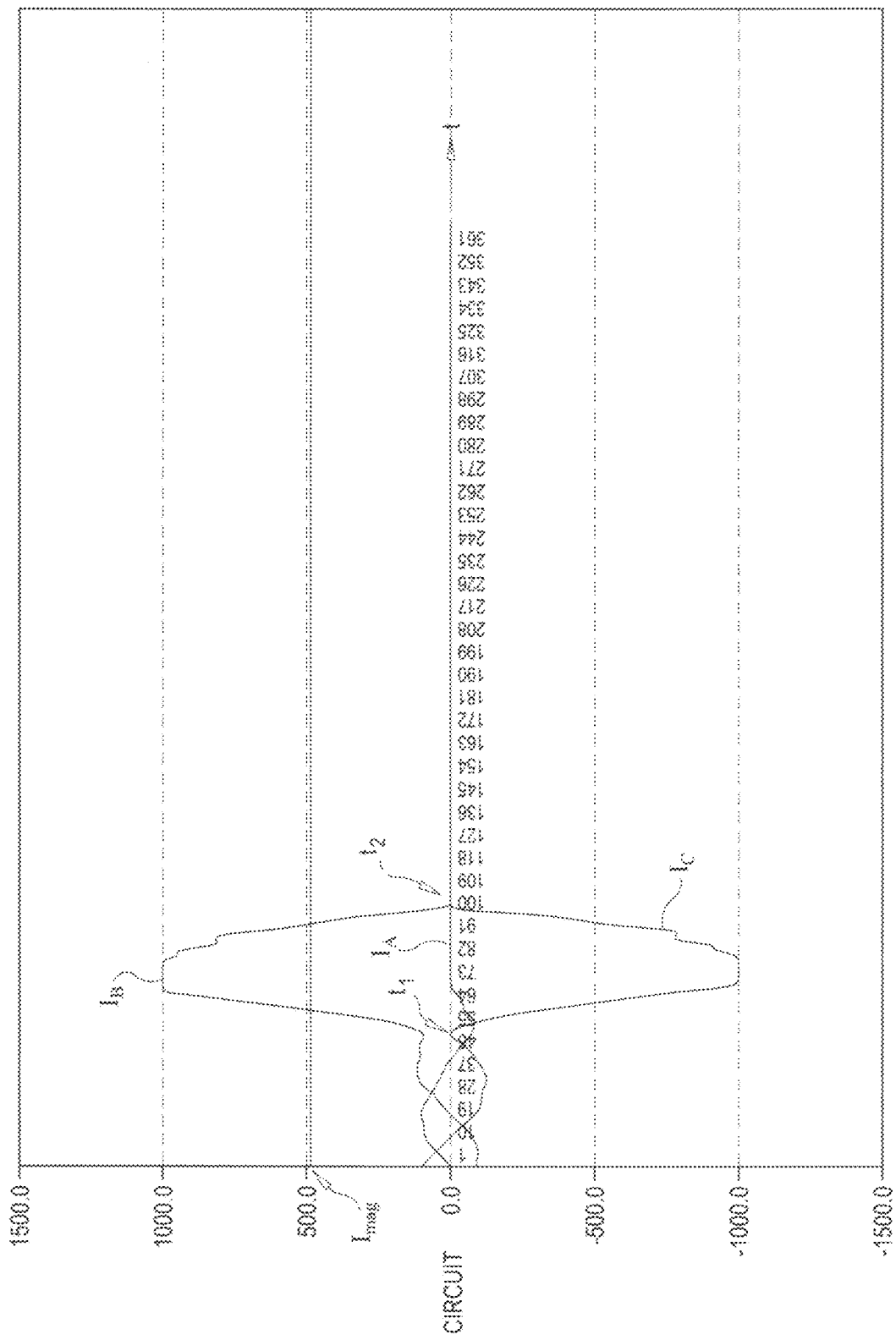
FIG. 10 shows an operating waveform of phase currents for the system of FIG. 8 under a fault condition.
Figure 11:
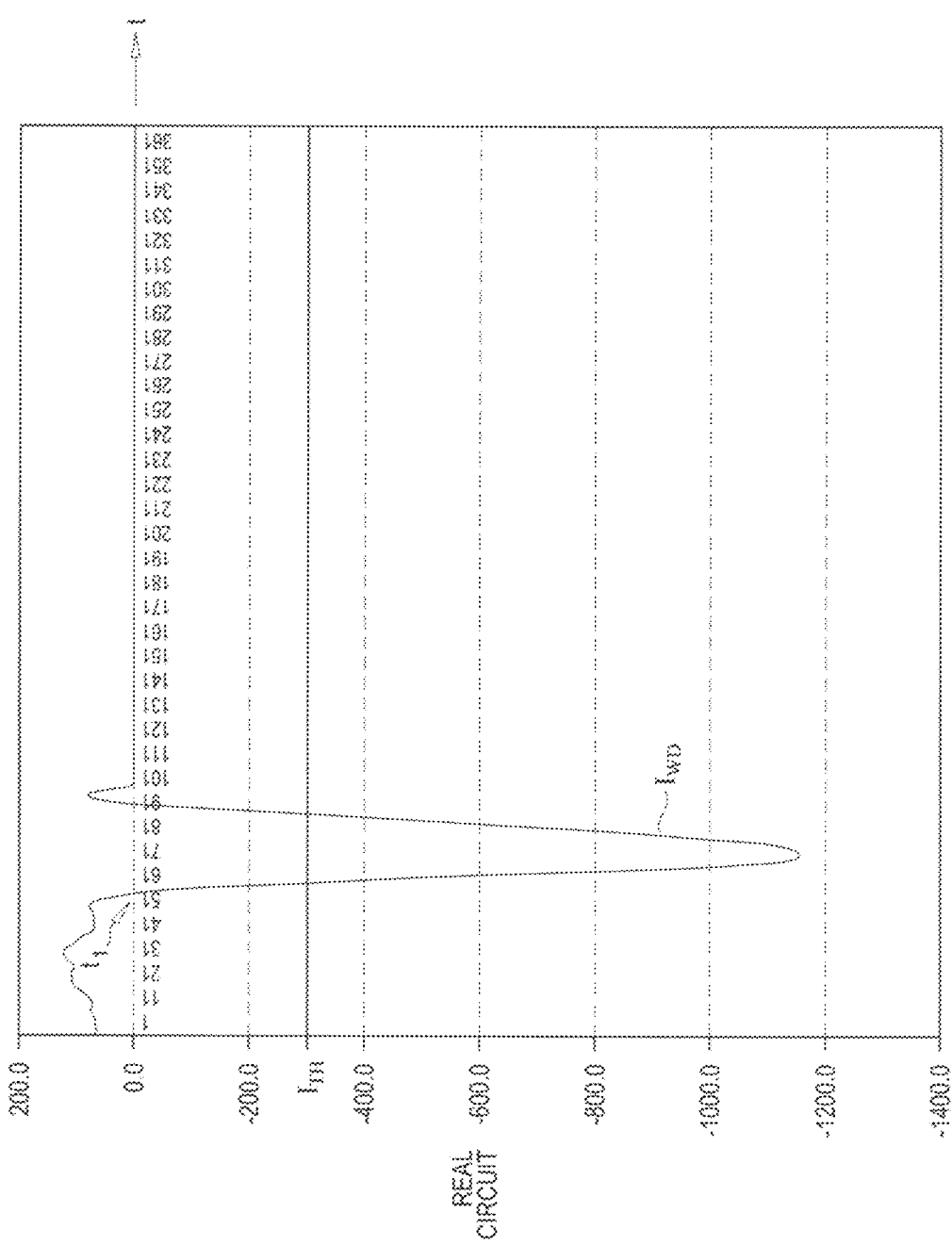
FIG. 11 shows an operating waveform of real current flow for the system of FIG. 8 under a fault condition.
Figure 12:
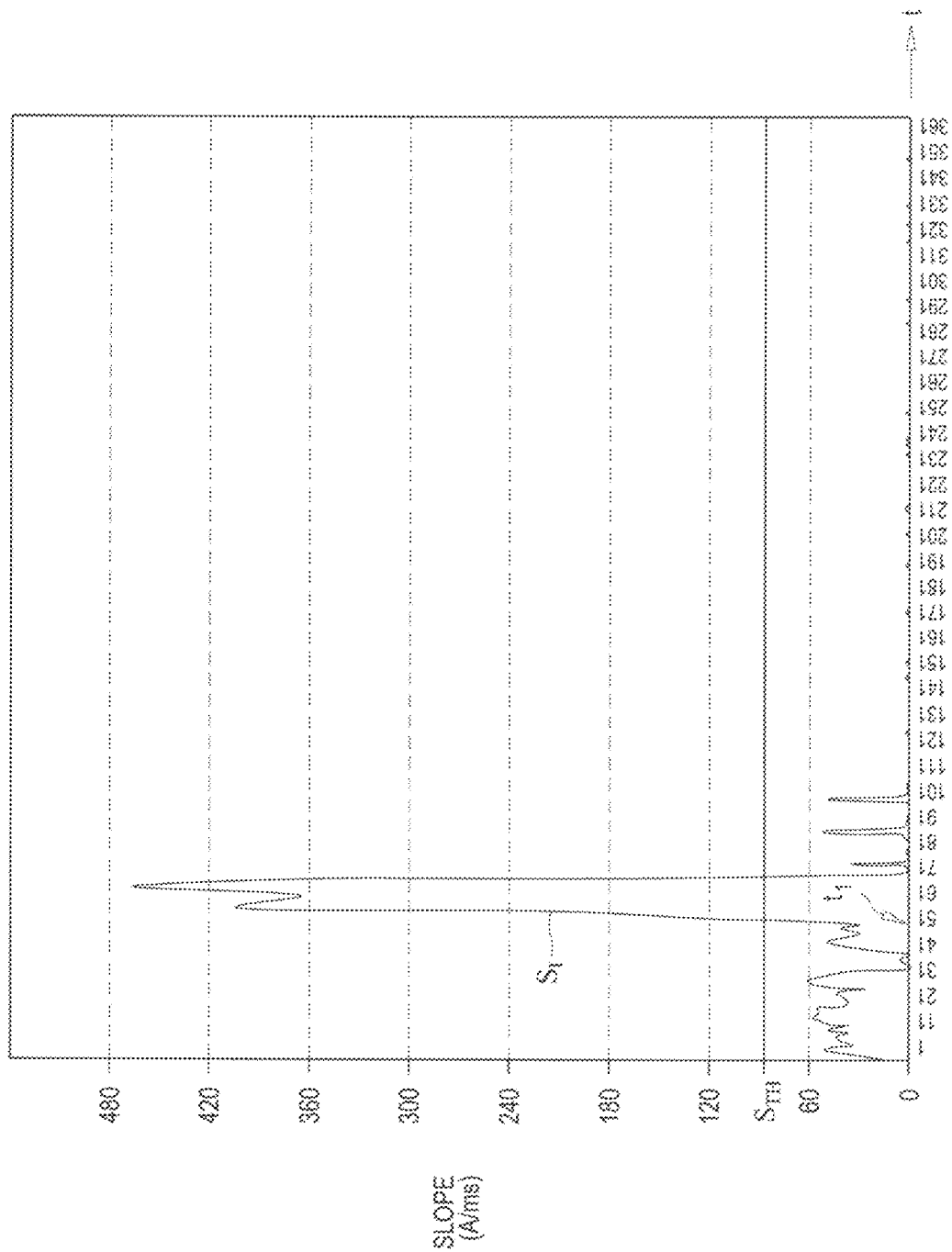
FIG. 12 shows an operating waveform of a calculated slope for the system of FIG. 8 under a fault condition.
Figure 13:
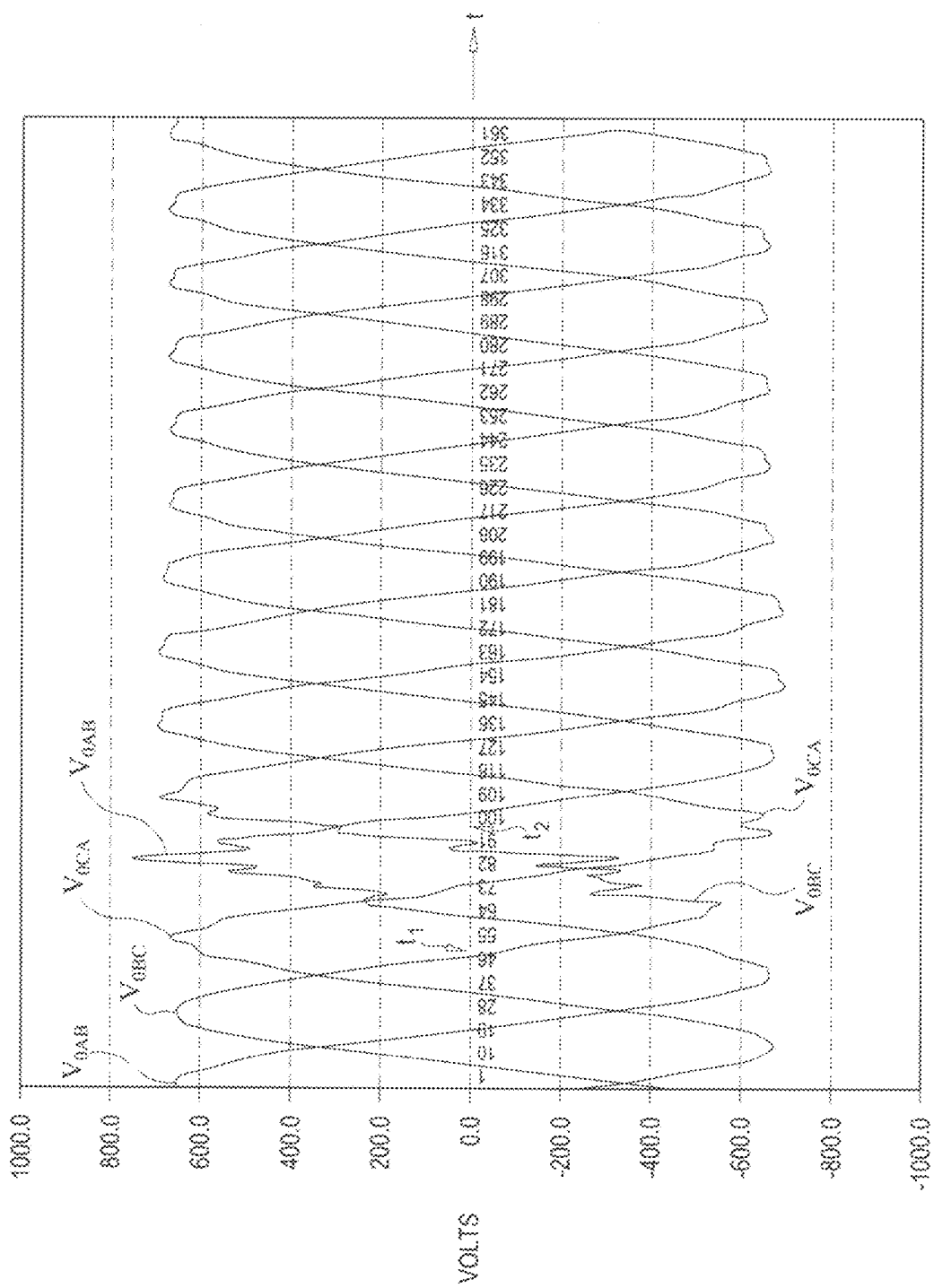
FIG. 13 shows an operating waveform of phase voltages for the system of FIG. 8 under a fault condition.

FIGS. 9 through 13 show operating waveforms for system 400 of FIG. 8. The numerical values on the time axis of FIGS. 9 through 13 denote sampling times. Samples are taken, or are derived from data taken, by a datalogger function included within the UPS. The time between samples is approximately equal to 200 microseconds (5000 samples-per-second sampling rate). FIG. 9 shows waveforms of the phase voltages, $V_{AB}$, $V_{BC}$, $V_{CA}$, across the secondary windings 405; FIG. 10 shows waveforms of the phase currents, $I_A$, $I_B$, $I_C$, in the secondary windings 405, as well as a magnitude threshold Imag (for clarity, only one magnitude threshold is shown—it should be understood that each phase current is monitored and compared to a respective threshold); FIG. 11 shows a waveform of real current flow, $I_{IND}$, at the input of the Adaptive UPS 410, calculated using a D-Q transform, as well as the real current threshold $I_{TH}$; FIG. 12 shows a calculated slope, $S_f$, of the divergence of the UPS input current away from zero, as well as the slope threshold $S_f$; and FIG. 13 shows the phase voltages at the output of the Adaptive UPS 410, $V_{OAB}$, $V_{OBC}$, $V_{OCA}$.

With reference to FIGS. 9 through 13, prior to a time t1 approximately 200 Kilowatts of three-phase power is delivered to loads 412 from first AC source 401 via transformer 404 and Adaptive UPS 410. At time t1, circuit breaker 420 is opened, causing a loss of an input phase, as described earlier with reference to the idealized waveforms of FIG. 6. The effect on the voltages at the input of the Adaptive UPS 402 illustrated in FIG. 9 is substantially the same as the idealized effect shown in FIG. 6. The Adaptive UPS 410 detects the input voltage fault and responds by enabling delivery of real power from the flywheel second AC source. As shown in FIGS. 10 and 11, the character of the input fault is such that it results in large flows of phase current (FIG. 10) as well as a backfeed of aggregate real current (FIG. 11) from the second AC source toward the UPS input 402. The magnitude of the flow of phase current is sufficiently large to cause the current delivered by the second AC source to reach a current limit of approximately 1000 Amperes. As indicated in the Figures, the magnitude of the phase currents (FIG. 10) and the aggregate real current (FIG. 11) each exceed their respective thresholds, Imag and $I_{TH}$, and the aggregate flow of real current is toward the input 402. As shown in FIG. 12, the slope of the change in phase current also exceeds the slope threshold, $S_f$.

Upon establishing that the criteria for detecting a backfeed have been met, the controller in the Adaptive UPS 410 will disable the conventional output voltage fault response and enable continued delivery of power from the second AC source (308, FIG. 7). In the system disclosed, the input source fault may be detected within 1 millisecond and delivery of power from the flywheel source may begin essentially immediately. Establishing whether the backfeed criteria are met may be accomplished in less than 2 milliseconds. By this means, the response to the input fault may be adapted in a sufficiently short time to effect continued delivery of power to the load from the second AC source.

Because of the phase shifts in the UPS input voltages following time t1 ($V_{CA}$, $V_{AB}$, FIG. 9), the backfeed of current persists until the input phase currents, $I_B$ and $I_C$, go to zero, and the corresponding static AC switch turns OFF (at time t2, FIG. 10). As shown in FIG. 13, the backfeed results in a substantial distortion of the load voltages at the output of the Adaptive UPS, including a partial collapse in the voltage of the phase voltage $V_{OBC}$. As noted above, known UPS systems may disconnect the second AC source and switch to bypass when an output undervoltage is sensed, which, as also noted above, would be inappropriate for this type of fault as it would connect a faulty input voltage 402 directly to the loads 412.

A method for controlling a UPS system of the kind that is configured to receive power from a first AC input source at a first UPS input, the first AC source characterized by a first AC period. and from a second AC input source at a second UPS input, and to deliver power to loads at a UPS output, may comprise: detecting and responding to a fault at the first input by enabling delivery of energy from the second AC input source, and within a time period that is less than an AC period, measuring and sensing a backfeed of energy from the second input to the first input, and adapting a subsequent fault response based upon the measuring of the backfeed. The method may further comprise enabling or disabling delivery of power from the second AC input source based upon the backfeed measurements. The backfeed measurements may comprise: measuring the rate-of-change of a current at an input; measuring a magnitude of a current at an input; and determining the polarity of the flow of real power, or real current, at an input. A backfeed measurement may be made at the first input; a backfeed measurement may be made at the second input; a backfeed measurement may comprise a measurement at both the first and the second inputs. The method may further comprise: comparing the rate-of-change of current at the input to a slope threshold and comparing the magnitude of the current at the input to a magnitude threshold. The comparing may be done within a determination interval that is less than one AC period. The method may further comprise continuing to enable delivery of power from the second AC input source if a backfeed measurement exceeds a respective threshold during the determination interval, or else disabling delivery of power from the second AC input source. The UPS may further comprise a bypass circuit which, when enabled, provides a connection between the first AC input source and the loads. The method may further comprise enabling the bypass circuit if a backfeed measurement does not exceed a respective threshold.

Various embodiments of an adaptive controller, such as adaptive controller 121 in FIG. 5, include, but are not limited to, the following. Some or all of the controller may be implemented as hardware or as software code and/or logical instructions that are processed by a computer, a microprocessor, a digital signal processor or other means, or a combination thereof. The logical processes, such as those shown as sequential processes in FIG. 7, may run concurrently or sequentially with respect to each other or with respect to other processes, such as measurement processes, UPS output voltage regulation processes and related calculations. An adaptive controller may be implemented in mixed-signal circuitry; in circuitry comprising mixed-signal circuitry comprising a microprocessor and/or digital signal processor core and/or a field-programmable-gate-array (FPGA) and/or an application-specific integrated circuit (ASIC); or in circuitry comprising a combination of mixed-signal circuitry and a separate microprocessor, digital signal processor, FPGA or ASIC. The controller may be implemented as an integrated circuit or a hybrid device. There may also be additional functions associated with the controller. Pre-determined values, such as the durations of the maximum and minimum operating intervals and the reference voltage, may be stored in read-only or re-programmable non-volatile memory.

It will be understood that various modifications may be made to the inventions described herein without departing from the spirit and scope of the invention. For example, the invention may comprise one or more additional power sources (e.g. a motor-generator set) to supply load power for relatively long periods of time should both the first and second sources be unable to do so.

What is claimed is:

1. An uninterruptible power supply system supplying power to a load, comprising:
   a first input receiving energy from a first AC voltage source, said first AC voltage source characterized by an AC period;
   a second input receiving energy from a second AC voltage source;
   an output delivering energy from said first AC voltage source or said second AC voltage source to a load; and
   a controller configured for selectable energy delivery to said load from said first AC voltage source and said second AC voltage source, said controller monitoring voltage and current at said first input, said second input, and said output, said controller detecting a primary fault from said first AC voltage source, wherein said controller disables said energy delivery to said load from said first AC voltage source and enables energy delivery from said second AC voltage source to said load;
   said controller configured to detect a secondary fault in said energy delivery to said load from said second AC voltage source;
   said controller configured to measure a current or power criterion of backfeed from said second AC voltage source to said first input for a time interval less than said AC period; and
   the controller configured to, upon determining that criterion of backfeed from said second AC voltage source to said first AC voltage source exceeds a threshold, prevent initiation of a bypass switch connecting said first AC voltage source to said load otherwise enabled for a detected secondary fault in said energy delivery to said load from said second AC voltage source.

2. The uninterruptible power supply system of claim 1, wherein said AC period is 1/60 of a second.

3. The uninterruptible power supply system of claim 1, wherein said AC period is 1/50 of a second.

4. The uninterruptible power supply system of claim 1, wherein determining that criterion of backfeed from said second AC voltage source to said first AC voltage source exceeds a threshold comprises a current magnitude exceeding a predetermined backfeed current magnitude threshold.

5. The uninterruptible power supply system of claim 1, wherein determining that criterion of backfeed from said second AC voltage source to said first AC voltage source exceeds a threshold comprises a current rate-of-change exceeding a predetermined backfeed current slope threshold.

6. The uninterruptible power supply system of claim 1, wherein determining that criterion of backfeed from said second AC voltage source to said first AC voltage source exceeds a threshold comprises at least one of:
   an aggregate real power and a polarity of a real power flow, exceeding a predetermined threshold.

7. The uninterruptible power supply system of claim 1, determining that criterion of backfeed from said second AC voltage source to said first AC voltage source exceeds a threshold comprises:
   an aggregate real current and a polarity of a real current flow, exceeding a predetermined threshold.

8. The uninterruptible power supply system of claim 1, wherein determining that criterion of backfeed exceeds a threshold comprises each of:
   a current magnitude of said measured backfeed exceeding a predetermined backfeed current magnitude threshold;
   a current rate-of-change of said measured backfeed exceeding a predetermined backfeed current slope threshold; and
   determining a direction of a real power flow of said measured backfeed.

9. The system of claim 1, wherein said controller is configured to measure for at least a second criterion of said backfeed.

10. A method for delivering power from an uninterruptible power supply system to a load, the method comprising:
    monitoring a first AC voltage source providing power to a load from a first input for a primary fault condition, said first AC voltage source characterized by an AC period;
    disabling said energy delivery to said load from said first AC voltage source and enabling power delivery from a second AC voltage source to said load from a second input upon detection of said primary fault condition;
    monitoring a backfeed from said second AC voltage source to said first input in a time interval less than said AC period; and
    preventing initiation of a bypass switch connecting said first AC voltage source to said load, the bypass switch otherwise enabled for a detected secondary fault in said power delivery to said load from said second AC voltage source, for the detected secondary fault if a current or power criterion of backfeed from said secondary AC voltage source is determined to exceed a threshold.

11. The method for delivering power from an uninterruptible power supply system of claim 10, wherein said AC period is 1/60 of a second.

12. The method for delivering power from an uninterruptible power supply system of claim 10, wherein said AC period is 1/50 of a second.

13. The method for delivering power from an uninterruptible power supply system of claim 10, wherein monitoring said backfeed comprises monitoring a current rate-of-change of said backfeed.

14. The method for delivering power from an uninterruptible power supply system of claim 10, wherein monitoring said backfeed comprises monitoring a current magnitude of said backfeed.

15. The method for delivering power from an uninterruptible power supply system of claim 10, wherein monitoring said backfeed comprises monitoring a polarity of flow of real power of a current of said backfeed.

16. The method for delivering power from an uninterruptible power supply system of claim 10, wherein monitoring said backfeed comprises monitoring a polarity of flow of real current of a current of said backfeed.

17. The method for delivering power from an uninterruptible power supply system of claim 10, wherein preventing said initiation of said bypass switch requires at least one detected condition selected from the group consisting of:
    a backfeed current magnitude is greater than a predetermined backfeed current magnitude threshold;
    a backfeed current rate-of-change is greater than a predetermined backfeed current slope threshold; and
    a direction of a backfeed real power flow is from said second AC voltage source to said first input at the end of a measurement period.

18. The method for delivering power from an uninterruptible power supply system of claim 17, wherein preventing said initiation of said bypass switch requires all conditions selected from the group consisting of:
  said backfeed current magnitude is greater than said predetermined backfeed current magnitude threshold;
  said backfeed current rate-of-change is greater than said predetermined backfeed current slope threshold; and
  said direction of said backfeed real power flow is from said second AC voltage source to said first input at the end of a measurement period.

* * * * *